(12) United States Patent
Nordstrom

(10) Patent No.: US 9,854,014 B2
(45) Date of Patent: Dec. 26, 2017

(54) MOTION DATA SHARING

(71) Applicant: Google Inc., Mountain View, CA (US)

(72) Inventor: Paul G. Nordstrom, Seattle, WA (US)

(73) Assignee: Google Inc., Mountain View, CA (US)

( * ) Notice: Subject to any disclaimer, the term of this patent is extended or adjusted under 35 U.S.C. 154(b) by 448 days.

(21) Appl. No.: 14/103,341

(22) Filed: Dec. 11, 2013

(65) Prior Publication Data

US 2014/0282105 A1   Sep. 18, 2014

Related U.S. Application Data

(60) Provisional application No. 61/786,081, filed on Mar. 14, 2013.

(51) Int. Cl.
| | |
|---|---|
| *H04L 29/06* | (2006.01) |
| *G06F 3/0481* | (2013.01) |
| *G06F 3/01* | (2006.01) |
| *G09B 19/00* | (2006.01) |
| *A63B 24/00* | (2006.01) |

(52) U.S. Cl.
CPC ........ *H04L 65/403* (2013.01); *A63B 24/0003* (2013.01); *G06F 3/016* (2013.01); *G06F 3/0481* (2013.01); *G09B 19/003* (2013.01)

(58) Field of Classification Search
CPC ...... G09B 5/00–5/14; G09B 9/00–9/52; G09B 19/00; G09B 19/0015; G09B 19/003; G09B 19/0038; G09B 19/24
See application file for complete search history.

(56) References Cited

U.S. PATENT DOCUMENTS 5,649,104 A * 7/1997 Carleton ................ G06F 3/038
                                                                 348/E7.083
5,679,004 A * 10/1997 McGowan ............. A63B 69/00
                                                                 434/247

(Continued)

FOREIGN PATENT DOCUMENTS

DE           2221767           11/1973

OTHER PUBLICATIONS

International Preliminary Report on Patentability in International Application No. PCT/US2014/020544, dated Sep. 24, 2015, 9 pages.

(Continued)

*Primary Examiner* — Weilun Lo
*Assistant Examiner* — Patrick Ramsey
(74) *Attorney, Agent, or Firm* — Fish & Richardson P.C.

(57) ABSTRACT

Methods, systems, and apparatus, including computer programs encoded on a computer storage medium, for sharing motion data between computer systems. In one aspect, a method includes receiving, at a first computer system that is associated with a first user, first information that defines a first physical movement that was performed by a second user; outputting, using one or more output devices, a representation of the first physical movement; detecting a second physical movement performed by the first user; providing, to a second computer system that is associated with the second user, second information that defines at least a portion of the second physical movement performed by the first user; receiving, in response to providing the second information to the second computer system, third information that defines a correction to the second physical movement; and outputting, by the first computer system, a representation of the correction to the second physical movement.

17 Claims, 7 Drawing Sheets

(56) References Cited

U.S. PATENT DOCUMENTS

| | | | |
|---|---|---|---|
| 5,846,086 A * | 12/1998 | Bizzi | A63B 24/0006 |
| | | | 434/247 |
| 2003/0061285 A1* | 3/2003 | Usui | G09B 19/0038 |
| | | | 709/205 |
| 2006/0170652 A1* | 8/2006 | Bannai | G06F 3/011 |
| | | | 345/156 |
| 2006/0227151 A1 | 10/2006 | Bannai | |
| 2010/0280418 A1 | 11/2010 | Klose | |
| 2011/0275045 A1* | 11/2011 | Bhupathi | G09B 19/003 |
| | | | 434/247 |
| 2011/0316845 A1* | 12/2011 | Roberts | G06T 19/006 |
| | | | 345/419 |
| 2012/0052946 A1* | 3/2012 | Yun | A63B 69/004 |
| | | | 463/32 |
| 2012/0206577 A1 | 8/2012 | Guckenberger et al. | |
| 2013/0072353 A1* | 3/2013 | Alessandri | A63B 21/062 |
| | | | 482/8 |
| 2013/0095924 A1* | 4/2013 | Geisner | A63F 13/00 |
| | | | 463/32 |
| 2013/0222565 A1* | 8/2013 | Guerin | H04N 7/18 |
| | | | 348/77 |
| 2014/0253589 A1* | 9/2014 | Tout | G06K 19/06159 |
| | | | 345/633 |

OTHER PUBLICATIONS

International Search Report and Written Opinion in International Application No. PCT/US2014/020544, dated Jun. 27, 2014, 11 pages.

"Designboom," [online] [Retrieved on Nov. 13, 2012]; Retrieved from the Internet URL: www.designboom.com/technology/augmented-reality-surgery-with-camdass/.

"Navy developing augmented-reality training system," [online] [Retrieved on Nov. 13, 2012]; Retrieved from the Internet URL: www.kurzweilai.net/navy-developing-augmented-reality-training-system, 2012, 2 pages.

Bailenson et al., "The Use of Immersive Virtual Reality in the Learning Sciences: Digital Transformations of Teachers, Students, and Social Context," The Journal of the Learning Sciences 17:102-141, 2008, 40 pages.

Dickey, 'Teaching in 3D: Pedagogical Affordances and Constraints of 3D Virtual Worlds for Synchronous Distance Learning,' Distance Education 24(2):105-121, 2003, 18 pages.

Jordan et al., "Augmented Reality Assisted Upper Limb Rehabilitation Following Stroke," Industrial Reasearch Ltd., New Zealand, www.intechopen.com, 21 pages.

Kolsch et al., "Multimodal Interaction with a Wearable Augmented Reality System," IEEE Computer Society pp. 62-71, 2006, 10 pages.

Samset et al., "Augmented Reality in Surgical Procedures," Proceedings of SPiE 2008, 12 pages.

Singhal et al., "Augmented Chemistry: Interactive Education System," International Journal of Computer Applications 49(15):1-5, 2012, 5 pages.

Soler et al., "Virtual Reality and Augmented Reality in Digestive Surgery," IRCAD-Hopital Civil, Strasbourg Cedex, 2004, 7 pages.

Winkler et al., "Connecting Second Life and Real Life: Integrating Mixed-Reality-Technology into Teacher Education," Proceedings of Society for Information Technology & Teacher Education International Conference ISBN 1-880094-67-3, pp. 1141-1148, 2009, 8 pages.

* cited by examiner

MOTION DATA SHARING

CROSS REFERENCE TO RELATED APPLICATION

This application claims the benefit under 35 U.S.C. §119 (e) of U.S. Provisional Patent Application No. 61/786,081 filed on Mar. 14, 2013, entitled "MOTION DATA SHARING," the entire content of which is hereby incorporated by reference.

BACKGROUND

This specification generally relates to sharing motion data between computer systems. Instruction that is adapted specifically to an individual user has traditionally been provided in-person. For example, to correct for quirks in a user's golf swing, a golf instructor may be present to watch the user's golf swing. Such in-person instruction can allow for the instructor to identify deviations from an optimal golf swing and to suggest correction's to the user's golf swing motion which will help the user match his/her swing more closely with the optimal golf swing.

SUMMARY

This specification generally describes technologies relating to sharing motion data between computer systems and allowing for motion-based interaction between computer users. For example, an expert user and a novice user can use separate computer systems to share motion data regarding a physical movement (e.g., swinging a golf club) and can remotely interact with each other for the expert user to provide instructions to the novice user regarding the physical movement.

In general, one innovative aspect of the subject matter described in this specification can be embodied in methods that include the actions of receiving, at a first computer system that is associated with a first user, first information that defines a first physical movement that was performed by a second user; outputting, by the first computer system using one or more output devices, a representation of the first physical movement; detecting a second physical movement performed by the first user; providing, by the first computer system and to a second computer system that is associated with the second user, second information that defines at least a portion of the second physical movement performed by the first user; receiving, in response to providing the second information to the second computer system, third information that defines a correction to the second physical movement; and outputting, by the first computer system, a representation of the correction to the second physical movement. Other embodiments of this aspect include corresponding systems, apparatus, and computer programs, configured to perform the actions of the methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the actions.

Particular embodiments of the subject matter described in this specification can be implemented so as to realize one or more of the following advantages. For example, users can readily obtain personalized help from experts without meeting in-person. For instance, a user who is located several hours from the nearest expert in a particular field (e.g., plumbing, fly fishing, surgery) can obtain personalized instruction from an expert in the relevant field instantly from a remote location without having to meet the expert in person.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document generally describes providing interactive sessions through which computing devices can capture, share, and present motion data. For example, an expert user that is associated with a first computing device (e.g., a laptop computer, a smartphone, a wearable computing device) can capture and transmit information regarding a physical movement to another computing device for presentation to another user (e.g., novice user). Such interactive sessions between computing devices can allow for a physical movement performed by one user to be presented within the context of a physical environment of another user. For example, physical movements performed by an expert user can be transmitted to and, through a display device, superimposed over in relevant items within a novice user's environment to which the expert user's physical movements pertain. For instance, an expert user showing a novice user how to access the trap of a plumbing fixture may initially place his/her hands at the appropriate locations along a physical plumbing line, which may be a physical plumbing line that is located in front of the expert user and/or a representation of the novice user's plumbing fixture, to remove the trap. For a novice user situated in front of the plumbing fixture at his/her house that he/she would like to access, the location of the expert user's hands and subsequent actions can be superimposed over relevant locations on the novice user's plumbing fixture.

Differences between physical movements performed by two or more users can be identified and used to determine whether corrective instructions/actions are needed. For example, if an expert performs and transmits an example golf swing to a novice user and the novice user's attempt to replicate the expert's swing is inaccurate (e.g., the novice is not extending his arms enough and his/her hands are too close to his/her body throughout the swing), the differences between the expert's swing and the novice's swing can be identified. These differences can be presented to the expert and/or the novice user (e.g., highlighting through augmented reality presentation, use of haptic feedback), and an expert user may generate and transmit additional motion data to the novice user that identifies one or more corrections to be made by the novice user. Such performance by a novice user and corrective instructions from an expert can be iteratively performed until the novice user has improved and/or attained sufficient skill level to perform the physical action under instruction.

Figure 1:
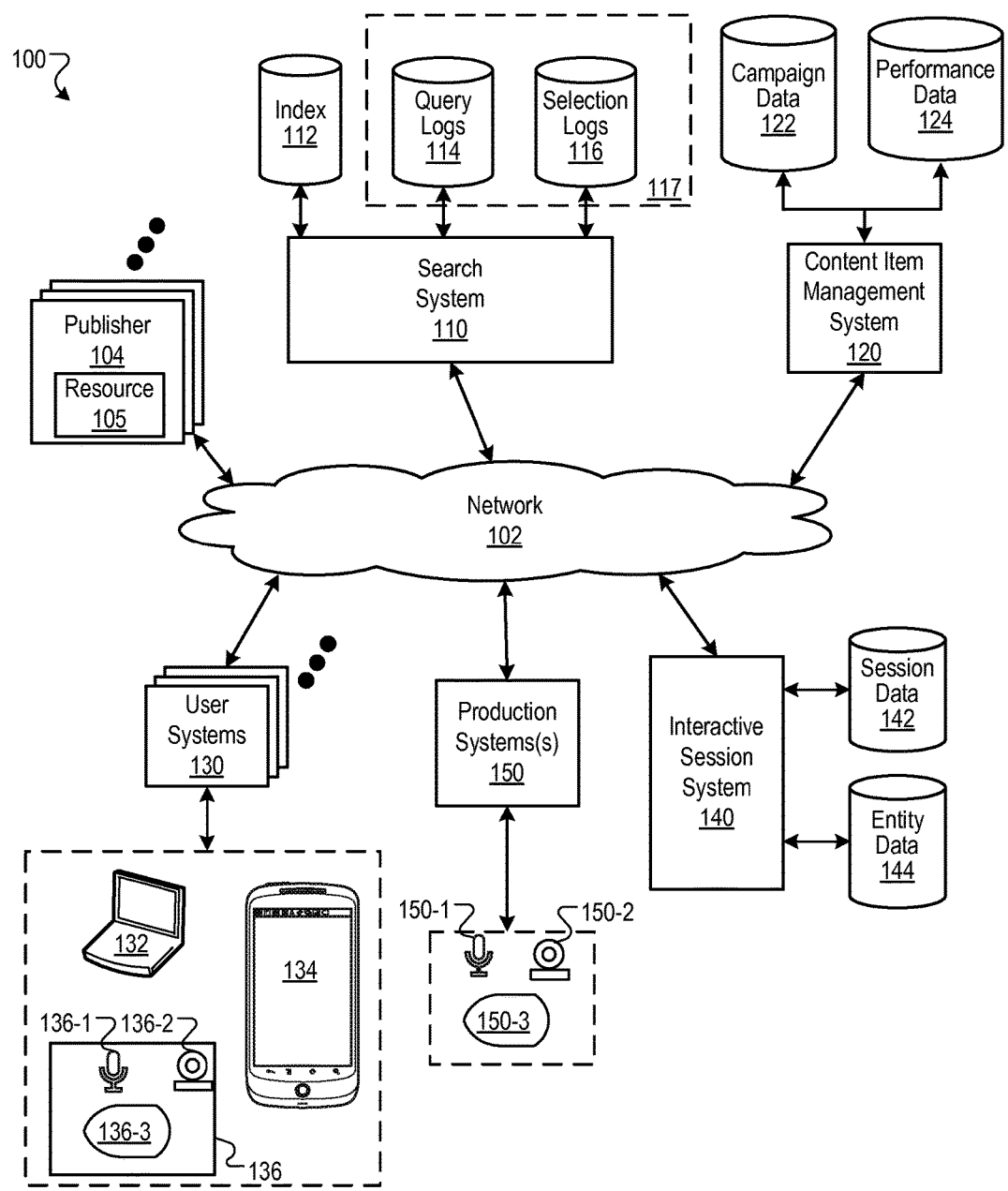
FIG. 1 is a block diagram of an example environment in which motion data is captured, analyzed, and shared between computer systems.

FIG. 1 is a block diagram of an example environment 100 in which motion data is captured, analyzed, and shared between computer systems. A data communication network 102 enables data communication between multiple electronic devices. Users can access content, provide content, exchange information, and participate in interactive sessions, such as motion data sharing sessions, by use of the devices and systems that can communicate with each other over the network 102. The network 102 can include, for example, a local area network (LAN), a cellular phone network, a wide area network (WAN), e.g., the Internet, or a combination of them. The links on the network can be wireline or wireless links or both.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each website 104 is maintained by a content publisher, which is an entity that controls, manages and/or owns the website 104. The publisher websites 104 can provide a variety of different web pages, such as web pages through which novice users can identify and initiate instructional motion data sharing sessions with expert users.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

In operation, a search engine 110 crawls the publisher web sites 104 and indexes the resources 105 provided by the publisher web sites 104 in an index 112. The search engine 110 can receive queries from user devices 130. In response to each query, the search engine 110 searches the index 112 to identify resources and information that are relevant to the query. The search engine 110 identifies the resources in the form of search results and returns the search results to the user device 130. A search result is data generated by the search engine 110 that identifies a resource or provides information that satisfies a particular search query. A search result for a resource can include a web page title, a snippet of text extracted from the web page, and a resource locator for the resource, e.g., the URL of a web page. For example, the resources 105 can include information that identifies expert users and their corresponding areas of expertise. The search results provided by the search engine 110 can allow novice users to identify expert users who have expertise in one or more fields that are relevant to the notice users.

The search results are ranked based on scores related to the resources identified by the search results, e.g., information retrieval ("IR") scores, and optionally a separate ranking of each resource relative to other resources, e.g., an authority score. The search results are ordered according to these scores and provided to the user device according to the order. For example, the search results can include information identifying expert users who are relevant to a novice user's query and the expert users can be ranked according to their relevance to the query.

A user device 130 receives the search results and presents them to a user. If a user selects a search result, the user device 130 requests the corresponding resource. The publisher of the web site 104 hosting the resource receives the request for the resource and provides the resource to the user device 130.

In some implementations, the queries submitted from user devices 130 are stored in query logs 114. Selection data for the queries and the web pages referenced by the search results and selected by users are stored in selection logs 116. The query logs 114 and the selection logs 116 define search history data 117 that include data from and related to previous search requests associated with unique identifiers. The selection logs represent actions taken responsive to search results provided by the search engine 110. The query logs 114 and selection logs 116 can be used to map queries submitted by user devices to resources that were identified in search results and the actions taken by users when presented with the search results in response to the queries. In some implementations, data are associated with the identifiers from the search requests so that a search history for each identifier can be accessed. The selection logs 116 and query logs 114 can thus be used by the search engine to determine the respective sequences of queries submitted by the user devices, the actions taken in response to the queries, and how often the queries have been submitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The content item management system 120 provides content items for presentation with the resources 105. A variety of appropriate content items can be provided—one example content item is an advertisement. In the case of advertisements, the content item management system 120 allows advertisers to define selection rules that take into account attributes of the particular user to provide relevant advertisements for the users. Example selection rules include keyword selection, in which advertisers provide bids for keywords that are present in either search queries or resource content or metadata. Advertisements that are associated with keywords having bids that result in an advertisement slot being awarded in response to an auction are selected for displaying in the advertisement slots. For example, advertisements can be provided that offer the instructional services of particular expert users.

When a user of a user device 130 selects an advertisement, the user device 130 generates a request for a landing page of the advertisement, which is typically a web page of the advertiser. For example, selection of an advertisement for an expert user can cause a request for a landing page for the corresponding expert user. The relevant advertisements can be provided for presentation on the resources 105 of the publishers 104, or on a search results page resource. For example, a resource 105 from a publisher 104 may include instructions that cause a user device to request advertisements from the content item management system 120. The request includes a publisher identifier and, optionally, keyword identifiers related to the content of the resource 105. The content item management system 120, in turn, provides advertisements to the requesting user device. With respect to a search results page, the user device renders the search results page and sends a request to the content item management system 120, along with one or more keywords related to the query that the user provide to the search engine 110. The content item management system 120, in turn, provides advertisements to the requesting user device.

In the case of advertisements, the content item management system 120 includes a data storage system that stores campaign data 122 and performance data 124. The campaign data 122 stores advertisements, selection information, and budgeting information for advertisers. The performance data 124 stores data indicating the performance of the advertisements that are served. Such performance data can include, for example, click-through rates for advertisements, the number of impressions for advertisements, and the number of conversions for advertisements. Other performance data can also be stored.

The campaign data 122 and the performance data 124 are used as input to an advertisement auction. In particular, the content item management system 120, in response to each request for advertisements, conducts an auction to select advertisements that are provided in response to the request. The advertisements are ranked according to a score that, in some implementations, is proportional to a value based on an advertisement bid and one or more parameters specified in the performance data 124. The highest ranked advertisements resulting from the auction are selected and provided to the requesting user device.

A user device 130 is an electronic device, or collection of devices, that is capable of requesting and receiving resources over the network 102. Example user systems 106 include personal computers 132, mobile communication devices 134, and other devices that can send and receive data 136 over the network 102. A user device 130 typically includes a user application, e.g., a web browser that sends and receives data over the network 102, generally in response to user actions. The web browser can enable a user to display and interact with text, images, videos, music and other information typically located on a web page at a website on the world wide web or a local area network. For example, a novice user and an expert user can use separate user devices, such as the user device 130, to interact with each other remotely over the network 102 through a motion data sharing session.

An interactive session system 140 is also accessible by the user devices 130 over the network 102. The interactive session system 140 serves interactive sessions and data related to interactive sessions to users of user devices 130.

The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 140 may also provide interactive sessions for other appropriate event types. For example, the interactive session system 140 can serve interactive sessions and data for sharing motion data between separate computer systems, such as a computer system associated with a novice user and a computer system associated with an expert user.

Furthermore, the data that the interactive session system 140 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents their intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 140 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer-related topics, in a side panel of a viewing environment as the interactive session is presented.

The sessions can be created by expert users or non-expert (novice) users. The term "expert user" is used in this specification to refer to a user or entity that has been accepted by the system 140 for a category, e.g., as a result of the user's or entity's having provided credentials or demonstrated a high level of skill. Examples include a licensed contractor for construction related videos or a company that produces sessions for a particular product the company manufactures and a user that has produced a large number of highly rated sessions.

In some implementations, the content item management system 120 can provide content items with the interactive sessions. In the case of advertisements, the content item management system 120 may select advertisements based on the subject matter of a session, the event type, and the user's intent. For example, for a repair event, the content item management system 120 may provide advertisements for providers of tools and parts that are listed in the list of tools and parts required to accomplish the repair task.

Production systems 150 can be used to create sessions. Production systems 150 may range from studios to simple hand-held video recording systems. Generally, a production system 150 is a system that includes one or more of an audio input device 150-1, a video input device 150-2, an optional display device 150-3, and optionally other input and output devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 150. For example, a particular interactive session may provide input data for a "G-suit" that applies pressure to a user's body and that the user interprets as simulated motion. Accordingly, appropriate input systems are used in the production system 150 to generate and store the input data for the interactive session.

Production systems 150 may also be or include devices that are attached to a person. For example, for "point of view" sessions, wearable computer devices that include a camera input device and microphone input device may be worn on a user's person during the time the user is creating the session.

The sessions are stored as sessions data 142 and are associated with authoring entities by entity data 144. A user can use a user device 130 to access the interactive session system 140 to request a session. The interactive session system 140 can provide a user interface to the user devices 130 in which interactive sessions are arranged according to a topical hierarchy. In some implementations, the interactive session system 140 includes a search subsystem that allows users to search for interactive sessions. Alternatively, the search system 110 can search the session data 142 and the entity data 144.

A user experiences a session by use of one or more user devices 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some implementations of an interactive session system 140 provide interactive sessions in real time or near-real time. A real time or near-real time interactive session can be an interactive session that is created in response to a user request for the interactive session. For example, real-time or near-real time sessions may be provided by a company for repairing a product sold by the company when the user cannot find a stored interactive session that fulfills the user's informational needs. Likewise, interactive sessions may be provided as part of a consultation process. For example, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

Figure 2:
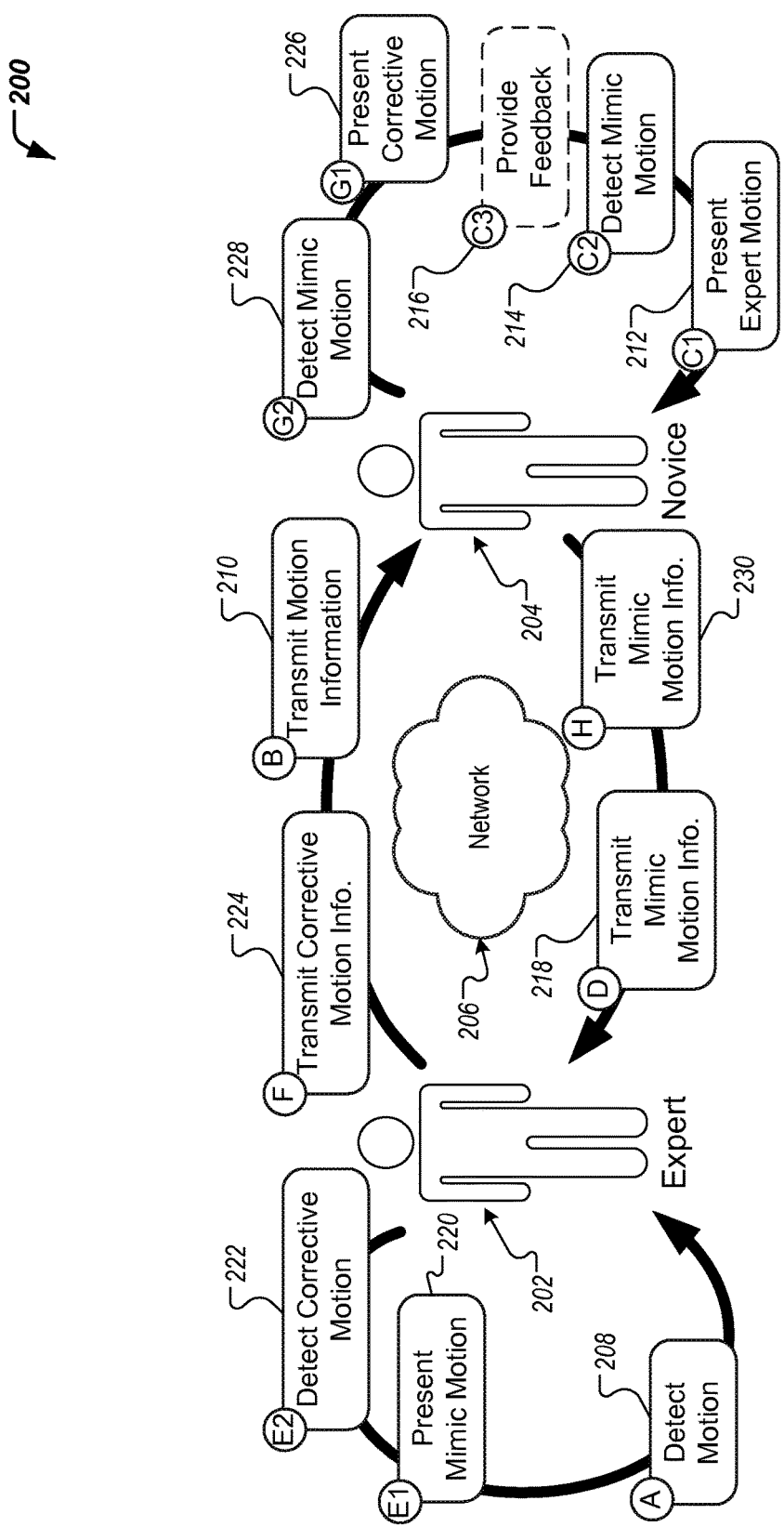
FIG. 2 is a conceptual diagram of a system for an interactive session between an expert user and a novice user.

FIG. 2 is a conceptual diagram of a system 200 for an interactive session between an expert user 202 and a novice user 204. The expert user 202 and the novice user 204 can each be associated with a computer system that includes, at least, one or more computing devices (e.g., laptop computer, desktop computer, smartphone, tablet computing device, wearable computing device), an input subsystem with one or more input devices (e.g., cameras, motion sensing devices, microphones, tactile sensing devices, depth sensing devices, physiological sensing devices), an output subsystem (e.g., display device, haptic feedback device, speakers, physiological interfaces). As described in this document, an expert user can be a user who is providing instructions to another user and a novice user can be a user to who is receiving instructions. Users may be designated as experts in some contexts and as novices in other contexts, including within the same interactive session (e.g., during an interactive session a user may provide instruction regarding a first topic and receive instruction regarding a second topic).

The interactions between the expert user 202 and the novice user 204 that are described below are provided through the use of such computer systems and a computer network 206. The computer network 206 can be any of a variety of appropriate communication networks, such as the network 102. The interactions between the expert user 202 and the novice user 204 are further illustrated in an example expert view and an example novice view that are depicted in FIG. 3, which provides example screenshots of a display provided to an expert user and a display provided to a novice user for an interactive session regarding repair/maintenance of a plumbing trap.

The example interactive session between the expert user 202 and the novice user 204 that is depicted in FIG. 2 begins with a computer system that is associated with the expert user 202 detecting one or more motions performed by the expert user 202, as indicated by step A (208). For example, referring to view 1*a* in FIG. 3, the expert user places his/her right hand 300 on a rotatable connector 302 (e.g., threaded connector) between the trap 304 and a drain pipe 306 that leads into the trap 304. The expert also places his/her left hand 308 on the trap 304 so as to minimize rotation of the trap 304 when the connector 302 is rotated. Such movement by the expert user, placing his/her hands 300 and 308 at particular places along the drain system, can be detected by a computer system associated with the expert user 202, as indicated by step A (208). As described in greater detail below, the motion by the expert user can be detected by a computer system in any of a variety of appropriate ways, such as through analysis of a video stream of the expert user's actions, through use of one or more motion sensing devices (e.g., G-suit embedded with motion, pressure, and/or touch sensors), and/or through the use of one or more depth sensors (e.g., sensors that determine the x, y, and z coordinates ("3D coordinates") of physical objects that are located in front of the depth sensors using, for example, an infrared laser projector and a monochrome CMOS sensor to determine 3D coordinates of objects in real time). Other devices and techniques for detecting motion are also possible.

The plumbing components 302-306 to which the expert user's motions pertain may be physical plumbing components that are at the expert user's location and/or the plumbing components 302-306 can be virtual representations of the novice user's physical plumbing components. For example, the configuration of the plumbing components at the novice user's location may be detected, through the use of one or more sensors (e.g., cameras, depth sensors), and transmitted to a computing device associated with the expert user for presentation in the expert user's view.

Figure 3:
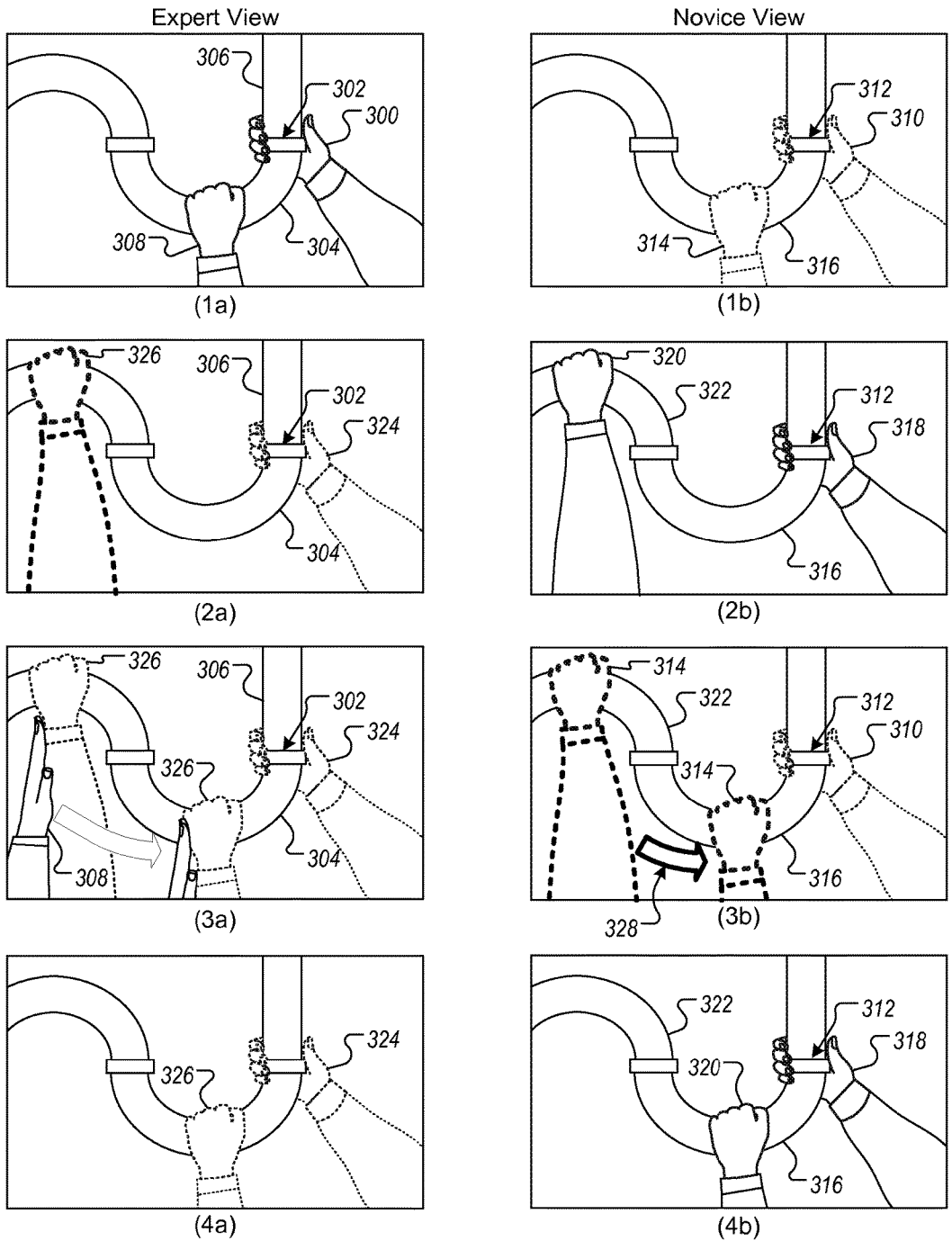
FIG. 3 depicts example screenshots of a display provided to an expert user and a display provided to a novice user for an example interactive session.

The expert view 1a that is depicted in FIG. 3 may be the view as presented to the expert user 202 through one or more display devices, such through a wearable pair of glasses capable of augmenting the expert user's view of his/her surroundings with additional graphical information. Although the example view 1a does not include any additional augmentation other than the expert user's physical environment, the example view 1a may include augmentation, such as a display of the novice user's environment that is overlaid on the expert user's environment (e.g., plumbing trap) and/or highlighting that identifies the detected motion performed by the expert (e.g., placing his/her hands on the connector 302 and on the trap 304).

As indicated by step B (210), information regarding the detected motion of the expert user 202 is transmitted over the network 206 and to a computer system that is associated with the novice user 204. Although not depicted in this example, the computer system associated with the expert user 202 may replay the detected motion to the expert user 202, may allow the expert user 202 to edit and/or modify the detected motion (e.g., trim the detected motion, modify hand placement within the detected motion), and may allow the expert user 202 to confirm that such detected motion should be transmitted to the novice user 204 before it is transmitted over the network 206. The computer system associated with the novice user 204 can present the expert motion to the novice user, as indicated by step C1 (212). For example, referring to view 1b from FIG. 3, the detected motions of the expert user are superimposed onto the physical environment of the novice user. For instance, a representation 310 of the right hand 300 of the expert user is superimposed in the novice's view at a location (rotatable connector 312) that corresponds to the location where the expert user's right hand 300 was located (rotatable connector 302) during the detected motion. Similarly, a representation 314 of the expert user's left hand 308 is superimposed over a trap 316, which is the same location in the expert's environment where the expert user's left hand 308 was positioned during the detected motion. The representations 310 and 314 of the expert user's hands can be placed in the novice user's view at appropriate locations over the novice user's physical environment using any of a variety of appropriate techniques (e.g., object detection techniques, object matching techniques, image processing techniques), such as by identifying one or more objects (e.g., trap 316, connector 312) from the novice user's view that correspond to one or more objects (e.g., trap 304, connector 302) from the expert user's view. Such contextual information (e.g., objects that are located within a view) can be transmitted between a computer system for the expert user 202 and a computer system for the novice user 204 as part of the motion information. The representations 310 and 314 can be displayed in the view using one or more visual effects to indicate to the novice user that the representations correspond to the expert user, such as through the use of particular colors, particular levels of transparency (e.g., can be displayed semi-transparent), and/or other visual effects. The representations 310 and 314 can be animated according to the motion detected for the expert user. For instance, the representations 310 and 314 can be displayed with movement in the novice's view that corresponds to the motion detected for the expert user. Displaying the representations 310 and 314 in the view 1b can provide instruct the novice user on how to perform the first step as indicated by the expert user in view 1a.

In response to presenting the expert motion, the computer system associated with the novice user 204 can detect mimicking motion from the novice user 204, as indicated by step C2 (214). Mimicking motion can be the novice user's attempt to perform the motions as instructed by the expert user 202 but within the novice user's physical environment. Mimicking motions can be detected in any of a variety of appropriate ways, such as by monitoring motions performed within a window of time (e.g., previous 5 seconds, previous 10 seconds) to determine whether the motions match or resemble at least a portion of the motions performed by the expert user, based on an cue from the user that he/she is about to attempt a mimicking motion (e.g., verbal cue such as "here goes," physical cues such as changes in posture or breathing patterns), and/or based on a prompt from the computing device associated with the novice user 204 to attempt to perform the expert user's action. Example mimicking motion by the novice user 204 is depicted in view 2b of FIG. 3. For instance, in view 2b the novice user places his/her right hand 318 at the correct location (at the rotatable connector 312) but does not place his/her left hand 320 in the appropriate corresponding location (trap 316). Instead, the novice user has placed his/her left hand 320 at a location (crown 322) that does not correspond to the placement of the expert user's left hand 308 at the trap 304. The mimicking motion of the novice user 204 can be detected at step C2 (214) in a similar manner to the detected motion of the expert user 202 at step A (208).

Figure 4:
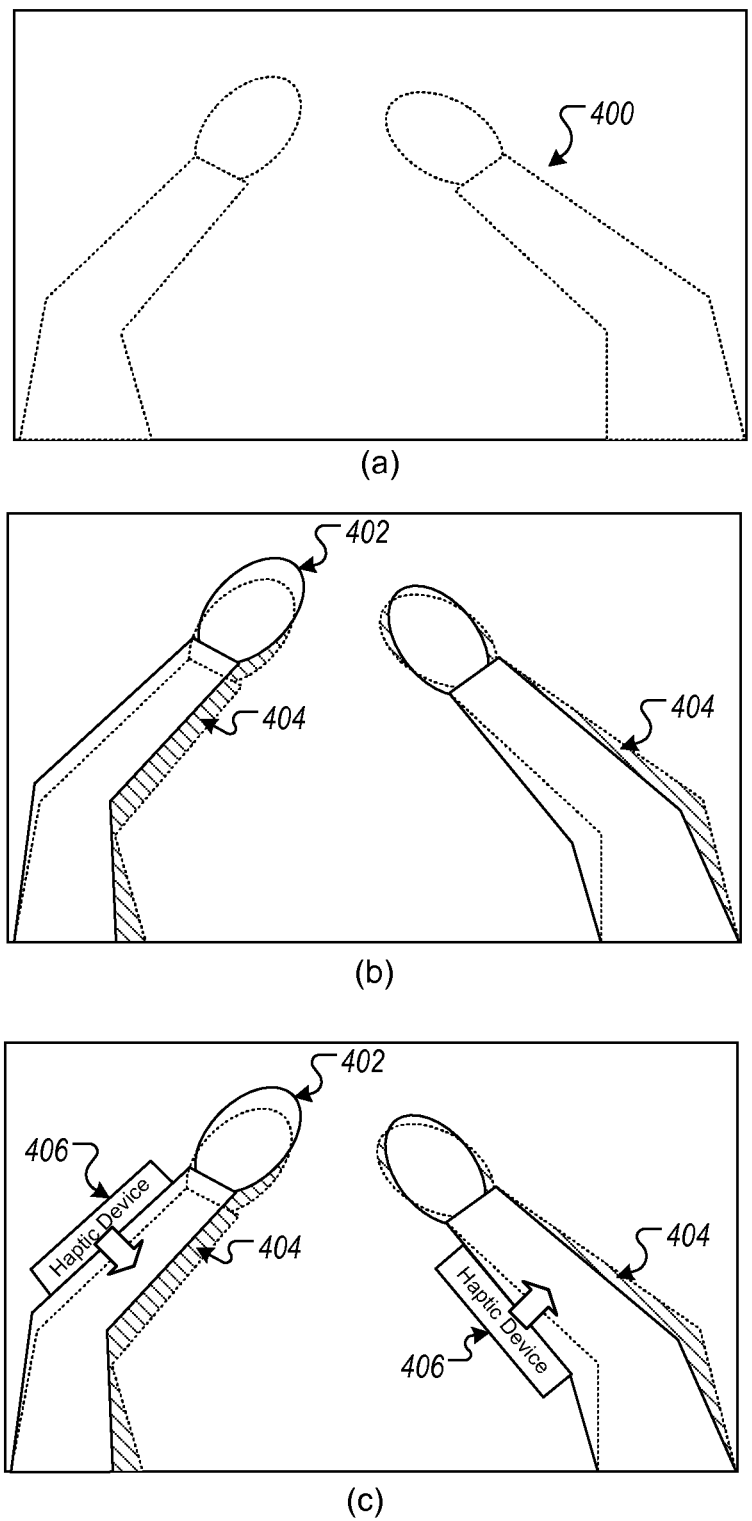
FIG. 4 depicts examples of feedback being provided to a user based on detected differences between the user's motion and the motion of another user.

In some implementations, the computing system that is associated with the novice user 204 can additionally provide feedback that indicates where, if at all, the novice user's mimicking motion has deviated from the motion performed by the expert user 202, as indicated by step C3 (216). For example, FIG. 4 depicts examples of feedback being provided to a user based on detected differences between the user's motion and the motion of another user. For instance, as depicted in view (a) of FIG. 4, a representation 400 of a physical movement performed by another user is presented, similar to the representations 310 and 314 described above with regard to view 1b of FIG. 3. As depicted in view (b) of FIG. 4, these representations 400 of movement by another user can continue to be superimposed over the view as the user attempts to mimic the representations 400. For instance, motion 402 performed by the user is depicted with the solid lines and the representations 400 are depicted with the dashed lines. While the user is performing the motion 402, deviations 404 from the representations 400 can be highlighted and provided to the user as visual feedback. Such deviations can be identified in real-time as the user is performing the motion 402 so that the user can know how his/her movements vary from those of another user and can modify the motion 402 to more closely align with the representations 400. In another example, one or more haptic devices 406 that are being worn or are otherwise attached to the user can be used to provide haptic feedback to guide the user in a direction to correct the deviations 404. For example, the user may be wearing clothing (e.g., shirt, pants, sleeve, glove, suit, helmet, hat, shoes, socks, and/or undergarments) that includes haptic devices and, based on the deviations 404, one or more appropriately located haptic devices 406 can be identified and activated to indicate a direction in which the user should move. For example, the haptic devices 406 may vibrate and/or otherwise apply physical force in one or more appropriate directions to correct the deviations 404.

Referring back to FIG. 2, a computer system that is associated with the novice user 204 can transmit information regarding the mimicking motion that was detected for the novice user 204, as indicated by step D (218). The computer system associated with the expert user 202 can receive the mimic information for the novice user 204 and can present the mimic information, as indicated by step E1 (220). For example, referring to view 2a of FIG. 3, representations 324 and 326 of the novice user mimicking motion using his/her hands 318 and 320 are superimposed over the plumbing components 302-306 that are present in the expert's physical environment. The computer system associated with the expert user can identify where, if at all, the mimicking motion for the novice user has deviated from the expert's motion as depicted in view 1a. Such deviations can be determined in any of a variety of appropriate ways, such as through image comparison techniques, pattern matching techniques, and/or object comparison techniques. If a difference of at least a threshold amount is detected, the difference can be highlighted, as indicated by the representation 326 that corresponds to the novice user's left hand 320 being bolded/weighted.

Based on the presentation of mimicking motion of the novice user 204 and identification of differences between the mimicking motion and the motion of the expert user 204, corrective motion can be provided by the expert user 202 and detected by a computer system that is associated with the expert user 202, as indicated by step E2 (222). For example, referring to view 3a, the expert user can physically move the representations 324 and 326 of the novice user's hands 318 and 320 to place them in the appropriate locations that correspond to the expert's motion in view 1a. For instance, in the depicted example the expert user uses his/her left hand 308 to move the representation 326 of the novice user's left hand 320 down and to the right so that it is holding on to the trap 304.

The computer system associated with the expert user 202 can transmit corrective motion information over the network 206 to the computer system associated with the novice user 204, as indicated by step F (224). In response to receiving the corrective motion information, the computer system that is associated with the novice user 204 can present the corrective motion, as indicated by step G1 (226). For example, referring to view 3b that is presented in FIG. 3, the representation 314 of the left hand is displayed with highlighting (bold) and is moved to the trap 316 as indicated by the arrow 328 and as instructed by the expert's corrective motion in view 3a. By highlighting the original deviation from to the position of the novice user's left hand and identifying the correction to be made to align the user's left hand with the expert's motion, the novice user can received personalized instruction that aids the novice user in learning an appropriate technique from the expert user.

Based on the presentation of the corrective motion, the novice user 204 can attempt to mimic the movements of the expert user 202 and a computer system associated with the novice user 204 can detect the second attempt at mimicking motion, as indicated by step G2 (228). Referring to view 4b from FIG. 3, the novice user may place his/her left hand 320 at the trap 316 (appropriate location that corresponds to the location of the expert user's left hand 308 at the trap 304) and his/her right hand 318 at the connector 312. The novice user's mimicking motion can be detected in a similar manner as the mimicking motion described above with regard to step C2 (214) and can be transmitted to the computer system associated with the expert user 202, as indicated by step H (230). Representations 324 and 326 that correspond to the novice user's hands 318 and 320 can be presented in a subsequent view 4a for the expert user, as depicted in FIG. 3. As indicated by the representations 324 and 326, which lack any highlighting in view 4a which may indicate at least a threshold difference from the expert user's original motion in view 1a, the novice user appears to have mimicked the expert user's motion with at least a threshold degree of accuracy. The expert user may then proceed to perform a next step in the process of the servicing the novice user's plumbing, such as unscrewing the connector 312 and the other connector for the trap. The steps of detecting and transmitting mimicking motion (steps C1-C2, G1-G2, and H) and detecting and providing corrective motions (steps E1-E2 and F) may be repeatedly performed until the novice user has successfully performed the instructed motion (or until another event, such as the end of a training session).

Although FIGS. 2-4 are presented with regard to movements of a user's hands, such techniques can be performed additionally and/or alternatively with regard to movement of other body parts, such as a user's torso, legs, feet, neck, and/or head. For example, instructions for kicking a ball could be transmitted between the expert user 202 and the novice user 206 using the same techniques and systems described above.

Although described with regard to computer systems that are associated with the expert user 202 and the novice user 204, a portion of the steps that are described in the system 200 can be performed by one or more other computer systems, such as the interactive session system 140. For example, the interactive session system 140 may perform tasks such as identifying differences between physical movements performed by the expert user 202 and mimicking movements performed by the novice user 204, and may provide information regarding such differences to one or both of the computer systems associated with the expert user 202 and the novice user 204.

Figure 5:
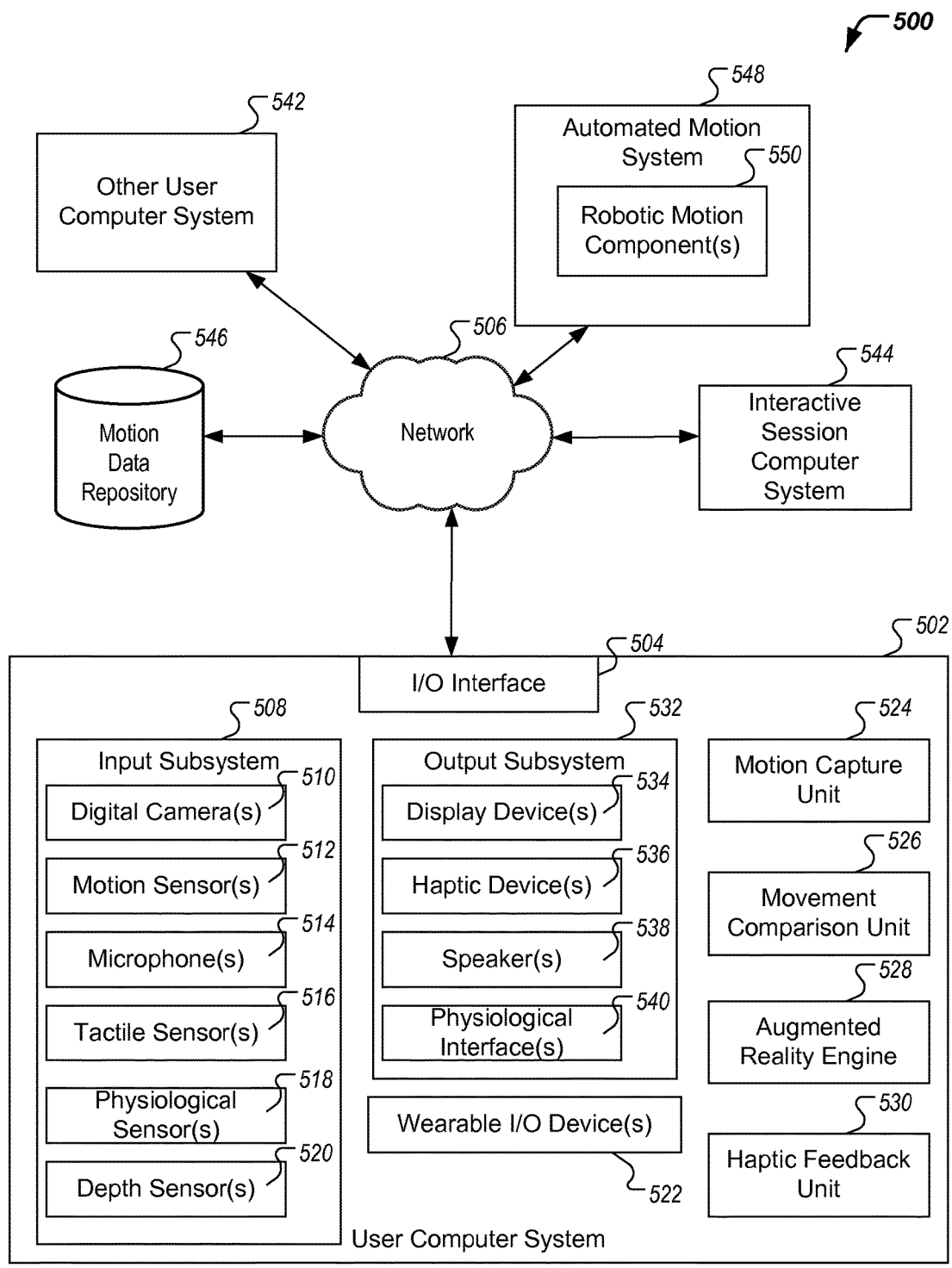
FIG. 5 is a diagram of an example system for sharing motion data between computer systems.

FIG. 5 is a diagram of an example system 500 for sharing motion data between computer systems. The system 500 includes an example user computer system 502 that can detect physical movements of one or more associated users and that present the physical movements of other users within the context of the physical environment of the one or more associated users. The computer system 502 can be similar to the computer systems described above as being associated with the expert user 202 and/or the novice user 204. The computer system 502 can also be similar to the user systems 130 described above with regard to FIG. 1.

The computer system 502 can include one or more computing devices. The computer system 502 includes an input/output (I/O) interface 504 through the computer system 500 can communicate with other computing devices over a network 506. The network 506 can be similar to the network 102 and/or the network 206. The I/O interface 504 can be any of a variety of appropriate interfaces, such as a wired network interface (e.g., Ethernet card) and/or a wireless network interface (e.g., WiFi chipset, mobile data network chipset).

The computer system 502 includes an input subsystem 508 through which user input can be detected and obtained, such as the detection of physical movements of one or more associated users. The input subsystem 508 can include one or more of a variety of devices through which user input, and particularly physical movement, can be detected. For example, the input subsystem 508 can include one or more digital cameras 510, one or more motion sending devices 512 (e.g., accelerometers, gyroscopes), one or more microphones 514, one or more tactile sensitive devices 516 (e.g., capacitive touch sensors, pressure sensitive surfaces), one or more physiological sensing devices (e.g., electromyographs to detect electrical activity produced by skeletal muscles as part of an electromyography (EMG) technique, brain wave detecting devices to record electrical activity along the scalp of a user, for example, as part of a electroencephalography (EEG) technique), and/or one or more depth sensors (e.g., sensors that determine the x, y, and z coordinates ("3D coordinates") of physical objects that are located in front of the depth sensors using, for example, an infrared laser projector and a monochrome CMOS sensor to determine 3D coordinates of objects in real time). Other types of input devices are also possible. One or more of the devices that are part of the input subsystem 508 can be embedded within and/or tethered to one or more wearable I/O devices 522, such as gloves, suits, shirts, sleeves, hats, pants, shoes, socks, and/or undergarments.

Input detected through the input subsystem 508 can be provided to and/or be analyzed by a motion capture unit 524 that is programmed to detect physical movements performed by one or more associated users. The motion capture unit 524 can use a variety of device drivers and/or application programming interfaces (APIs) to interpret the input received through the devices of the input subsystem 508. The motion capture unit 524 can detect motion using any of a variety of appropriate techniques, such as determining whether input from the motion sensing devices 512 and/or tactile sensing devices 516 match one or more patterns, identifying objects and analyzing changes in such objects from images captured through the digital cameras 510 over a period of time, and/or determining whether physiological signals detected by the one or more physiological sensing devices 518 match one or more patterns.

Movements that are detected by the motion capture unit 524 may be provided to a movement comparison unit 526, which is programmed to determine whether the detected movements differ from physical movements by one or more other users and, if so, to what degree. Movements may be represented in a variety of ways, such as a series images (e.g., a video) and/or as 2D/3D wireframe model with one or more points that move over time. The movement comparison unit 526 can compare movements by comparing such data representations of movement (e.g., performing image comparisons, performing wireframe model comparisons).

Physical movements performed by other users and/or detected differences from such movements can be used by an augmented reality engine 528 and/or a haptic feedback unit 530 to provide a depiction of the motions of other users within the context of a user's physical environment. The augmented reality engine 528 can superimpose physical movements by other users can highlight differences between such movements and the movements detected by the motion capture unit 524, similar to the augmented views depicted in FIGS. 3-4. The haptic feedback unit 530 can identify appropriate haptic devices to activate and appropriate levels of force for such activations, and can activate such haptic devices to provide an appropriate feedback to the user. The augmented reality engine 528 and the haptic feedback unit 530 can use an output subsystem 532 of the computer system 502 to provide such feedback to a user of the computer system 502. The output subsystem 502 includes one or more devices, such as one or more display devices 534 (e.g., computer display, touchscreen, glasses with embedded display), one or more haptic devices 536 (e.g., devices providing tactile feedback to a user), one or more speakers 538, and/or one or more physiological interfaces 540 (e.g., devices providing low voltage electrical impulses to stimulate one or more specific muscles).

The system 500 can also include one or more other user computer systems 542, which are similar to the user computer system 502. For example, the expert user 202 can be associated with the user computer system 502 and the novice user 204 can be associated with the other user computer system 542, which can be the same as or similar to the user computer system 502. Interaction among the user computer system 502 and the other user computer system 542 to share motion data may be facilitated by an interactive session computer system 544, which can be similar to the interactive session system 140 described above with regard to FIG. 1. Processing associated with one or more components of the user computer system 502, such as processing associated with the movement comparison unit 526, may be performed, at least in part, by the interactive session computer system 544.

The user computer system 502, the other user computer system 542, and/or the interactive session computer system 544 may be configured to store information regarding detected user motion in a motion data repository 546. For example, detected motion data may provide a series of motions that can be shared with the user computer system 502 and/or the other user computer system 542, and that can serve to supplement the current unavailability of other users. For instance, the user computer system 502 may contact the interactive session computer system 544 to connect with another computer system associated with an expert in a particular subject matter. If such an expert is not available, the interactive session computer system 544 may suggest one or more motions from the motion data repository 546. If accepted by the user computer system 502, appropriate data can be retrieved from the repository 546 and can either be directly provided to the user computer system 502 or served by the interactive session computer system 544.

In some implementations, the system 500 can also include an automated motion system 548 that includes one or more robotic motion components 550. The automated motion system 548, for example, may be a manufacturing facility that includes machines that use motion patterns to perform one or more automated tasks. Such an automated motion system 548 may obtain and use motion data from the user computer system 502 and/or the motion data repository 546 to instruct the robotic motion components 550 to perform one or more tasks.

Figure 6A:
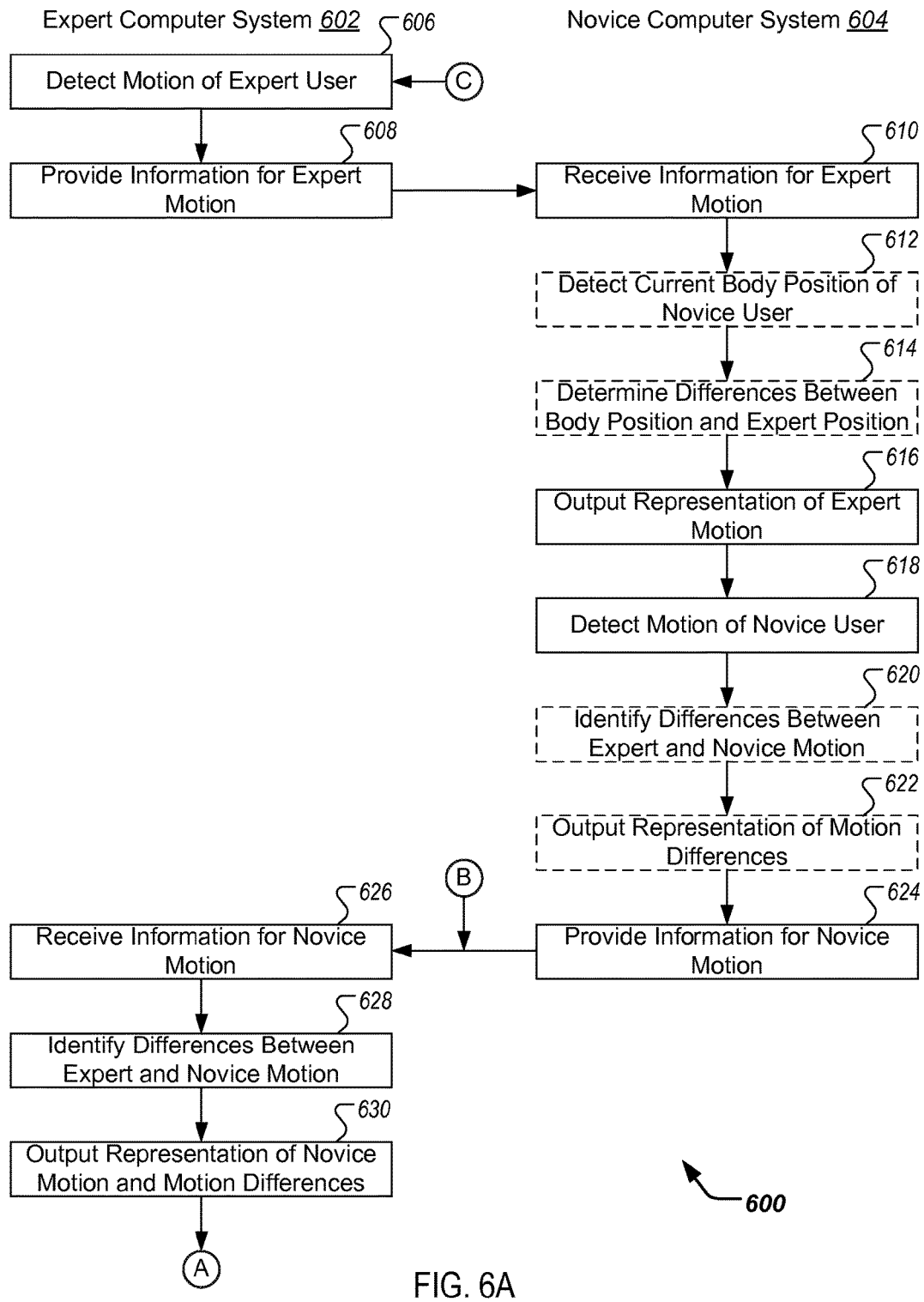
FIGS. 6A-B are flowcharts of an example technique for sharing motion data between computing devices.
Figure 6B:
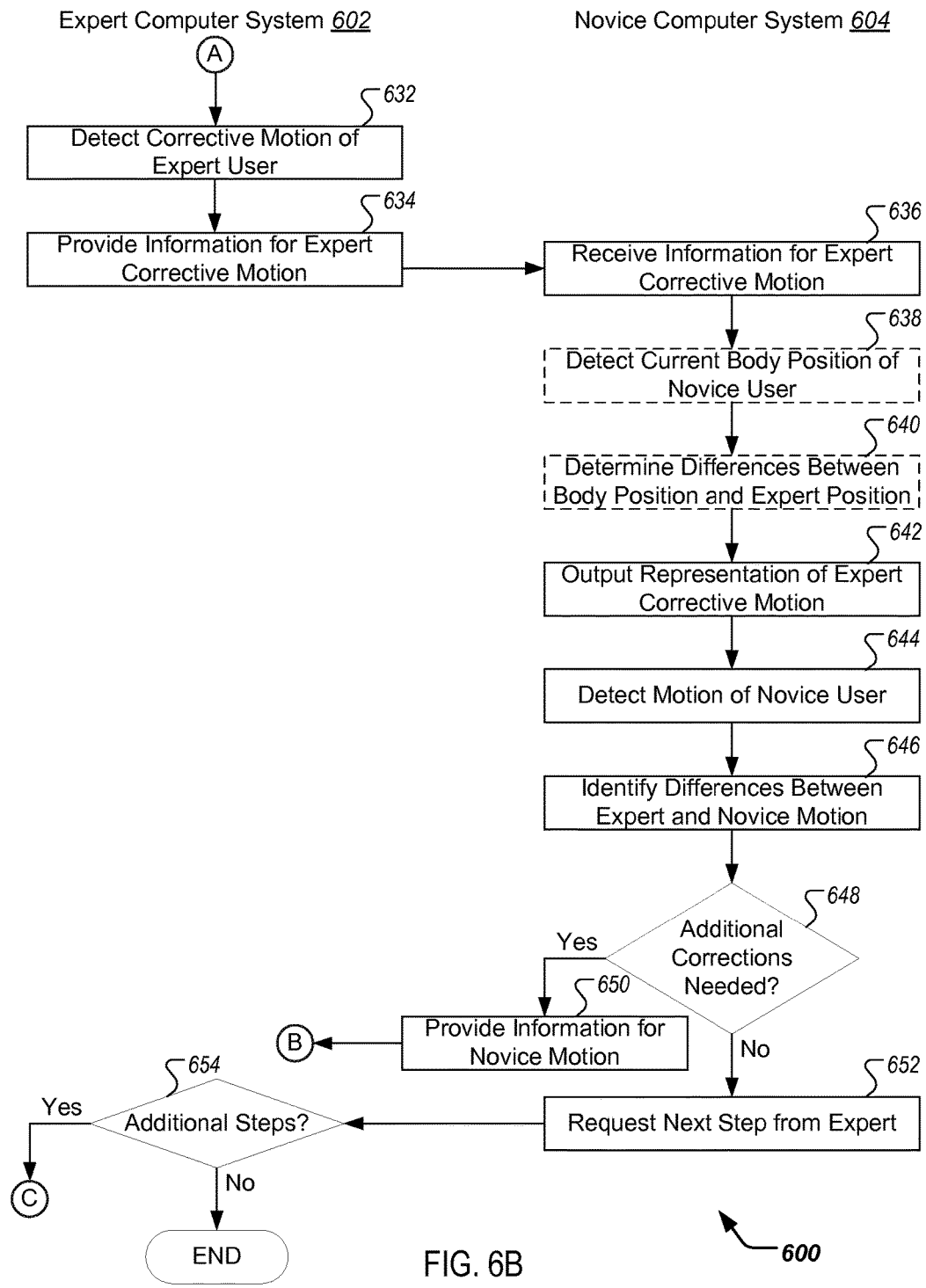

FIGS. 6A-B are flowcharts of an example technique 600 for sharing motion data between computing devices. The example technique 600 is depicted as being performed in part by an expert computer system 602 that is associated with an expert user and in part by a novice computer system 604 that is associated with a novice user. The expert computer system 602 and/or the novice computer system 604 can be any of a variety of appropriate computer systems, such as the user systems 130, the computer systems described as being associated with the expert user 202 and/or the novice user 204, the user computer system 502, and/or the other user computer system 542.

Referring to FIG. 6A, the expert computer system 602 can detect motion of an expert user that is associated with the expert computer system 602 (606). For example, the user computer system 502 can use the input subsystem 508 and the motion capture unit 524 to detect motion of a user associated with the computer system 502. The expert computer system 602 can provide information for the detected expert motion to the novice computer system 604 (608). For example, the user computer system 502 can transmit information regarding motion detected by the motion capture unit 524 to the other user computer system 542 through the network 506.

The novice computer system 604 can receive the information for the expert motion (610) and, in some implementations, can detect a current body position of the novice user (612) and determine differences between the body position of the novice user and the position of the expert user (614). Such differences may be used to provide the novice user with suggestive feedback as to which way the novice user should move his/her body from its current position so that his/her body correctly aligns with the position of the expert's body. For example, the other user computer system 542 can use its input subsystem (similar to the input subsystem 508) and motion capture unit (similar to the motion capture unit 524) to detect the current position of at least a portion of a corresponding user's body, and can use a movement comparison unit (similar to the movement comparison unit 528) to determine differences between the user's current position (e.g., based on data describing the user's current position) and another user's body position (e.g., based on data describing the expert's motion).

The novice computer system 604 can output representations of the expert motion (616). The output representations may be output with information that identifies differences between the novice user's body position and the expert user's body position, such as through visually highlighting such differences on a display device and/or providing haptic feedback at one or more appropriate haptic feedback devices located on or near the novice user's body. For example, an augmented reality engine (similar to the augmented reality engine 528) and/or a haptic feedback unit (similar to the haptic feedback unit 530) of the other user computer system 542 can direct one or more components of the output subsystem 532 to output one or more representations of another user's detected motion, such as the representations depicted in FIGS. 3-4.

The novice computer system 604 can detect motion of the novice user that attempts to mimic the expert user's motion (618). For example, the other user computer system 542 can use an input subsystem (similar to the input subsystem 508) and a motion capture unit (similar to the motion capture unit 524) to detect the mimicking motion of an associated user. In some implementations, the novice computer system 604 can identify differences between the expert and novice motion (620) and can output representations of the detected differences (622). For example, differences can be detected by a movement comparison unit (similar to the movement comparison unit 526) and an augmented reality engine (similar to the augmented reality engine 528) and/or a haptic feedback unit (similar to the haptic feedback unit 530) of the other user computer system 542 can direct one or more components of the output subsystem 532 to output one or more representations of the differences between the associated user's motion and the motion of another user, such as the representations depicted in FIGS. 3-4.

The novice computer system 604 can provide information regarding the mimicking motion performed by the novice user (624) and the expert computer system 602 can receive such information (626). The expert computer system 602 can identify differences between the expert and novice motion (628) and can output one or more representations of the differences (630). For example, the user computer system 502 can use the movement comparison unit 526 to detect differences between the motions performed by different users and the augmented reality engine 528 and/or haptic feedback unit 530 can provide output that represents the differences via the output subsystem 532, such as the representations depicted in FIGS. 3-4.

Referring to FIG. 6B, the expert computer system 602 can detect one or more corrective motions performed by the expert user (632) and can provide information regarding the corrective motion to the novice computer system (604). For example, the user computer system 502 can detect the corrective motion using the input subsystem 508 and the motion capture unit 524, similar to the description above with regard to view 3a in FIG. 3.

The novice computer system 604 receives the information for the corrective expert motion (636) and, in some implementations, detects a current body position of the novice user (638) and determines differences between the current body position of the novice user and the corrective motion of the expert user (640). The steps 636-640 can be similar to the steps 610-614 described above with regard to FIG. 6A. The novice computer system 604 can output a representation of the corrective motion provided by expert computer system 602 (642). For example, the other user computer system 542 can use an augmented reality engine (similar to the augmented reality engine 528) and/or a haptic feedback unit (similar to the haptic feedback unit 530) to provide output that identifies and/or highlights the corrective motion provided by another user, such as the output depicted in view 3b of FIG. 3. The novice computer system 604 can detect subsequent motion by the novice user (644) and can identify (and output) differences between the detected motion of the novice user and the corrective motion of the expert user (646). The steps 644 and 646 can be similar to the steps 618-622.

The novice computer system 604 can determine whether additional corrections to the motion of the novice user are needed based, at least in part, on the identified differences between the novice user motion and the corrective motion from the expert user (648). If additional corrections are determined to be needed, then the novice computer system 604 can provide information regarding the novice input detected at step 644 to the expert computer system 602 and the technique can resume at step 626. Such a loop of, first, the expert computer system 602 determining and providing corrective motion to the novice computer system 604 and, second, the novice computer system 604 outputting the corrective motion and determining whether subsequent user motion has matched the corrective motion with at least a threshold degree of accuracy, may be repeatedly performed until no further correction is determined to be needed at step 648. In such a case, the novice computer system 604 can provide a request for a next step to the expert computer system 602 (652). In response to receiving such a request, the expert computer system 602 can determine whether any additional steps are included in the information that is being taught to the novice user (654). If further steps are included in the information that is being taught to the novice user, then the technique 600 can repeat beginning at step 606 for the next step. If no further steps are included in the information, then the technique 600 can end.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, e.g., web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. However, a computer need not have such devices. Moreover, a computer can be embedded in another device, e.g., a mobile telephone, a smart phone, a mobile audio or video player, a game console, a Global Positioning System (GPS) receiver, and a wearable computer device, to name just a few. Devices suitable for storing computer program instructions and data include all forms of non-volatile memory, media and memory devices, including by way of example semiconductor memory devices, magnetic disks, and the like. The processor and the memory can be supplemented by, or incorporated in, special purpose logic circuitry.

To provide for interaction with a user, embodiments of the subject matter described in this specification can be implemented on a computer having a display device for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input and output.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   displaying, on a first display device of a first computer system that is associated with a first user, a view of a first physical environment of the first user and that shows one or more first physical objects that are located in the first physical environment;

joining, by the first computer system, an interactive session with a second computer system that is separate from the first computer system, wherein the second computer system is associated with a second user and includes a second display device displaying a view of a second physical environment of the second user and that shows one or more second physical objects that are located in the second physical environment;

receiving, at the first computer system and while displaying the view of the first physical environment of the first user, information that identifies the one or more second physical objects that are located in the second physical environment and a physical movement that is performed by the second user in the second physical environment in relation to the one or more second physical objects, wherein the first and second users are concurrently participating in the interactive session and the second user is located remotely from the first user;

determining a correspondence between (i) the one or more first physical objects that are located in the first physical environment of the first user and (ii) the one or more second physical objects that are located in the second physical environment of the second user;

based on the correspondence, translating the physical movement performed by the second user in relation to the one or more second physical objects to a virtual movement performed in relation to the one or more first physical objects;

displaying, on the first display device of the first computer system and superimposed over the view of the first physical environment of the first user, a representation of the virtual movement performed in relation to the one or more first physical objects, wherein the representation of the virtual movement is an animation of at least a portion of the second user's body performing the physical movement;

providing, by the first computer system and to the second computer system, and in response to detecting a physical movement in the first physical environment performed by the first user in relation to the one or more first physical objects, information that defines at least a portion of the physical movement performed by the first user in relation to the one or more first physical objects;

receiving, at the first computer system and from the second computer system as a response to the information that defines the at least the portion of the physical movement performed by the first user in relation to the one or more first physical objects, information that identifies a suggested correction to the physical movement performed by the first user in relation to the one or more first physical objects, wherein the suggested correction is based on a corrective motion provided by the second user in which the animation of the at least the portion of the first user's body is moved to an appropriate location with regard to the one or more second physical objects in the view of the second physical environment that is in proximity of the second user; and displaying, on the first display device of the first computer system and superimposed over the view of the first physical environment of the first user, a representation of the suggested correction.

2. The computer-implemented method of claim 1, further comprising:
   detecting a current position of at least a portion of the first user's body; and
   determining one or more differences between the current position of the first user's body and the physical movement that is performed by the second user in the second physical environment in relation to the one or more second physical objects;
   wherein displaying the representation of the virtual movement performed in relation to the one or more first physical objects comprises displaying a representation of the determined one or more differences between the current position of the first user's body and the physical movement that is performed by the second user in relation to the one or more second physical objects.

3. The computer-implemented method 1, wherein:
   the first user is a novice with regard to subject matter to which the physical movement performed by the first user pertains; and
   the second user is an expert with regard to the subject matter to which the physical movement that is performed by the second user pertains.

4. The computer-implemented method of claim 1, wherein determining the correspondence between (i) the one or more first physical objects that are located in the first physical environment of the first user and (ii) the one or more second physical objects that are located in the second physical environment of the second user comprises:
   analyzing, by the first computer system using an object recognition technique, information about the first physical environment of the first user to identify the one or more first physical objects, and analyzing information about the second physical environment of the second user to identify the one or more second physical objects;
   identifying one or more of the first physical objects that correspond to one or more of the second physical objects; and
   matching each of the one or more identified first physical objects to a corresponding one of the one or more identified second physical objects.

5. The computer-implemented method of claim 1, wherein the physical movement performed by the first user in relation to the one or more first physical objects is detected after initiating displaying of the representation of the virtual movement performed in relation to the one or more first physical objects.

6. The computer-implemented method of claim 1, wherein displaying the representation of the suggested correction comprises highlighting or making bold a displayed representation of at least a portion of the first user's body that has been identified as requiring corrective physical movement.

7. The computer-implemented method of claim 1, wherein the first computer system includes a first camera device that captures the view of the first physical environment from the point of view of the first user, and the second computer system includes a second camera device that captures the view of the second physical environment from the point of view of the second user.

8. The computer-implemented method of claim 1, wherein the first display device comprises a first pair of glasses that includes at least one transparent screen that displays the animation of the at least the portion of the second user's body such that the animation appears superimposed over the view of the first physical environment of the first user.

9. The computer-implemented method of claim 1, further comprising:
based on the correspondence between (i) the one or more first physical objects that are located in the first physical environment and (ii) the one or more second physical objects that are located in the second physical environment, translating the physical movement performed by the first user to a virtual movement performed in relation to the one or more second physical objects; and
displaying, on the second display of the second computer system and superimposed over the view of the second physical environment of the second user, a representation of the virtual movement performed in relation to the one or more second physical objects, wherein the representation of the virtual movement is an animation of at least a portion of the first user's body performing the physical movement.

10. A computer system, comprising:
one or more computer processors; and
one or more non-transitory computer-readable media having instructions stored thereon that, when executed by the one or more computer processors, cause performance of operations comprising:
displaying, on a display device of the computer system, a view of a first physical environment of a first user associated with the computer system and that shows one or more first physical objects that are located in the first physical environment;
joining, by the computer system, an interactive session with a second computer system that is separate from the computer system, wherein the second computer system is associated with a second user and includes a second display device displaying a view of a second physical environment of the second user and that shows one or more second physical objects that are located in the second physical environment;
receiving, at the computer system and while displaying the view of the first physical environment of the first user, information that identifies the one or more second physical objects that are located in the second physical environment and a physical movement performed by the second user in the second physical environment in relation to the one or more second physical objects, wherein the first and second users are concurrently participating in the interactive session and the second user is located remotely from the first user;
determining a correspondence between (i) the one or more first physical objects that are located in the first physical environment that is in proximity of the first user and (ii) the one or more second physical objects that are located in the second physical environment of the second user;
based on the correspondence, translating the physical movement performed by the second user in relation to the one or more second physical objects to a virtual movement performed in relation to the one or more first physical objects;
displaying, on the display device of the computer system and superimposed over the view of the first physical environment of the first user, a representation of the virtual movement performed in relation to the one or more first physical objects, wherein the representation of the virtual movement is an animation of at least a portion of the second user's body performing the physical movement;
providing, by the computer system and to the second computer system, and in response to detecting a physical movement in the first physical environment performed by the first user in relation to the one or more first physical objects, information that defines at least a portion of the physical movement performed by the first user in relation to the one or more first physical objects;
receiving, at the computer system and from the second computer system as a response to the information that defines the at least the portion of the physical movement performed by the first user in relation to the one or more first physical objects, information that identifies a suggested correction to the physical movement performed by the first user in relation to the one or more first physical objects, wherein the suggested correction is based on a corrective motion provided by the second user in which an animation of at least a portion of the first user's body is moved to an appropriate location with regard to the one or more second physical objects in the view of the second physical environment of the second user; and
displaying, on the display device of the computer system and superimposed over the view of the first physical environment of the first user, a representation of the suggested correction.

11. The computer system of claim 10, wherein determining the correspondence between (i) the one or more first physical objects that are located in the first physical environment of the first user and (ii) the one or more second physical objects that are located in the second physical environment of the second user comprises:
analyzing, by the computer system using an object recognition technique, information about the first physical environment of the first user to identify the one or more first physical objects, and analyzing information about the second physical environment of the second user to identify the one or more second physical objects;
identifying one or more of the first physical objects that correspond to one or more of the second physical objects; and
matching each of the one or more identified first physical objects to a corresponding one of the one or more identified second physical objects.

12. The computer system of claim 10, wherein the physical movement performed by the first user in relation to the one or more first physical objects is detected after initiating displaying of the representation of the virtual movement performed in relation to the one or more first physical objects.

13. The computer system of claim 10, wherein displaying the representation of the suggested correction comprises highlighting or making bold a displayed representation of at least a portion of the first user's body that has been identified as requiring corrective physical movement.

14. A non-transitory computer readable storage medium storing instruction that, when executed, cause one or more computing devices to perform operations comprising:
displaying, on a first display device of a first computer system that is associated with a first user, a view of a first physical environment of the first user and that shows one or more first physical objects that are located in the first physical environment;

joining, by the first computer system, an interactive session with a second computer system that is separate from the first computer system, wherein the second computer system is associated with a second user and includes a second display device displaying a view of a second physical environment of the second user and that shows one or more second physical objects that are located in the second physical environment;

receiving, at the first computer system and while displaying the view of the first physical environment of the first user, information that identifies the one or more second physical objects that are located in the second physical environment and a physical movement that is performed by the second user in the second physical environment in relation to the one or more second physical objects, wherein the first and second users are concurrently participating in the interactive session and the second user is located remotely from the first user;

determining a correspondence between (i) the one or more first physical objects that are located in the first physical environment of the first user and (ii) the one or more second physical objects that are located in the second physical environment of the second user;

based on the correspondence, translating the physical movement performed by the second user in relation to the one or more second physical objects to a virtual movement performed in relation to the one or more first physical objects;

displaying, on the first display device of the first computer system and superimposed over the view of the first physical environment of the first user, a representation of the virtual movement performed in relation to the one or more first physical objects, wherein the representation of the virtual movement is an animation of at least a portion of the second user's body performing the physical movement;

providing, by the first computer system and to the second computer system, and in response to detecting a physical movement in the first physical environment performed by the first user in relation to the one or more first physical objects, information that defines at least a portion of the physical movement performed by the first user in relation to the one or more first physical objects;

receiving, at the first computer system and from the second computer system as a response to the information that defines the at least the portion of the physical movement performed by the first user in relation to the one or more first physical objects, information that identifies a suggested correction to the physical movement performed by the first user in relation to the one or more first physical objects, wherein the suggested correction is based on a corrective motion provided by the second user in which an animation of at least a portion of the first user's body is moved to an appropriate location with regard to the one or more second physical objects in the view of the second physical environment of the second user; and displaying, on the first display device of the first computer system and superimposed over the view of the first physical environment of the first user, a representation of the suggested correction.

15. The non-transitory computer readable storage medium of claim 14, wherein determining the correspondence between (i) the one or more first physical objects that are located in the first physical environment of the first user and (ii) the one or more second physical objects that are located in the second physical environment of the second user comprises:

analyzing, by the computer system using an object recognition technique, information about the first physical environment of the first user to identify the one or more first physical objects, and analyzing information about the second physical environment of the second user to identify the one or more second physical objects;

identifying one or more of the first physical objects that correspond to one or more of the second physical objects; and matching each of the one or more identified first physical objects to a corresponding one of the one or more identified second physical objects.

16. The non-transitory computer readable storage medium of claim 14, wherein the physical movement performed by the first user in relation to the one or more first physical objects is detected after initiating displaying of the representation of the virtual movement performed in relation to the one or more first physical objects.

17. The non-transitory computer readable storage medium of claim 14, wherein displaying the representation of the suggested correction comprises highlighting or making bold a displayed representation of at least a portion of the first user's body that has been identified as requiring corrective physical movement.

* * * * *